United States Patent [19]

Tomiyori

[11] Patent Number: 5,715,364
[45] Date of Patent: Feb. 3, 1998

[54] CALL MONITOR APPARATUS FOR SPEECH PROCESSING EQUIPMENT

[75] Inventor: Makio Tomiyori, Tokyo, Japan

[73] Assignee: NEC Corporation, Tokyo, Japan

[21] Appl. No.: 390,224

[22] Filed: Feb. 16, 1995

[30] Foreign Application Priority Data

Feb. 18, 1994 [JP] Japan ............... 6-043349

[51] Int. Cl.$^6$ ................................ G10L 7/08
[52] U.S. Cl. ............................. 395/2.21; 375/27
[58] Field of Search .................. 395/2.21; 375/27

[56] References Cited

U.S. PATENT DOCUMENTS

| | | | |
|---|---|---|---|
| 4,150,258 | 4/1979 | Fujimoto et al. | 379/290 |
| 4,574,383 | 3/1986 | Irie et al. | 375/27 |
| 5,239,558 | 8/1993 | Shimizu | 395/2.21 |
| 5,384,807 | 1/1995 | Yatim et al. | 375/27 |

FOREIGN PATENT DOCUMENTS 61-284136  12/1986  Japan ............... H04J 3/00

OTHER PUBLICATIONS

Haspeslagh et al., ("3.4/7 kHz Audio Bandwidth selectable digital phone interface (DPI) chip with on chip analog functions and modem", Proceedings of the Nineteenth European Solid State Circuits Conference, Sep. 22–23, 1993, pp. 162–165).

Haspeslagh et al., ("A 4/7kHz audio bandwidth selectable digital phone interface (DPI) chip with on–chip analog functions and modem", IEEE Journal of Solid–State Circuits, vol.29, Issue 8, Aug. 1994, pp. 914–920).

Primary Examiner—Allen R. MacDonald
Assistant Examiner—Vijay B. Chawan
Attorney, Agent, or Firm—Foley & Lardner

[57] ABSTRACT

A call monitor apparatus for a speech processing equipment includes a digital speech processing equipment, a signal identifier, a switching unit, a decoder, a silent signal generator, a PCM converter, and a D/A converter. The digital speech processing equipment has a speech mode, a speech data mode, and a data mode. The signal identifier identifies an operation mode of the speech processing equipment and outputs an identification signal. The switching unit switches an output destination of the output signal from the speech processing equipment. The decoder converts an output signal from the switching unit into a μlaw PCM signal when the identification signal from the signal identifier indicates the speech data mode. The silent signal generator outputs a silent μlaw PCM signal when the identification signal from the signal identifier indicates the data mode. The PCM converter respectively converts, into PCM signals, an output signal output from the switching unit when the identification signal from the signal identifier indicates the speech mode and the μlaw PCM signals from the decoder and the silent signal generator. The D/A converter converts the PCM signals from the PCM converter into analog signals.

6 Claims, 1 Drawing Sheet

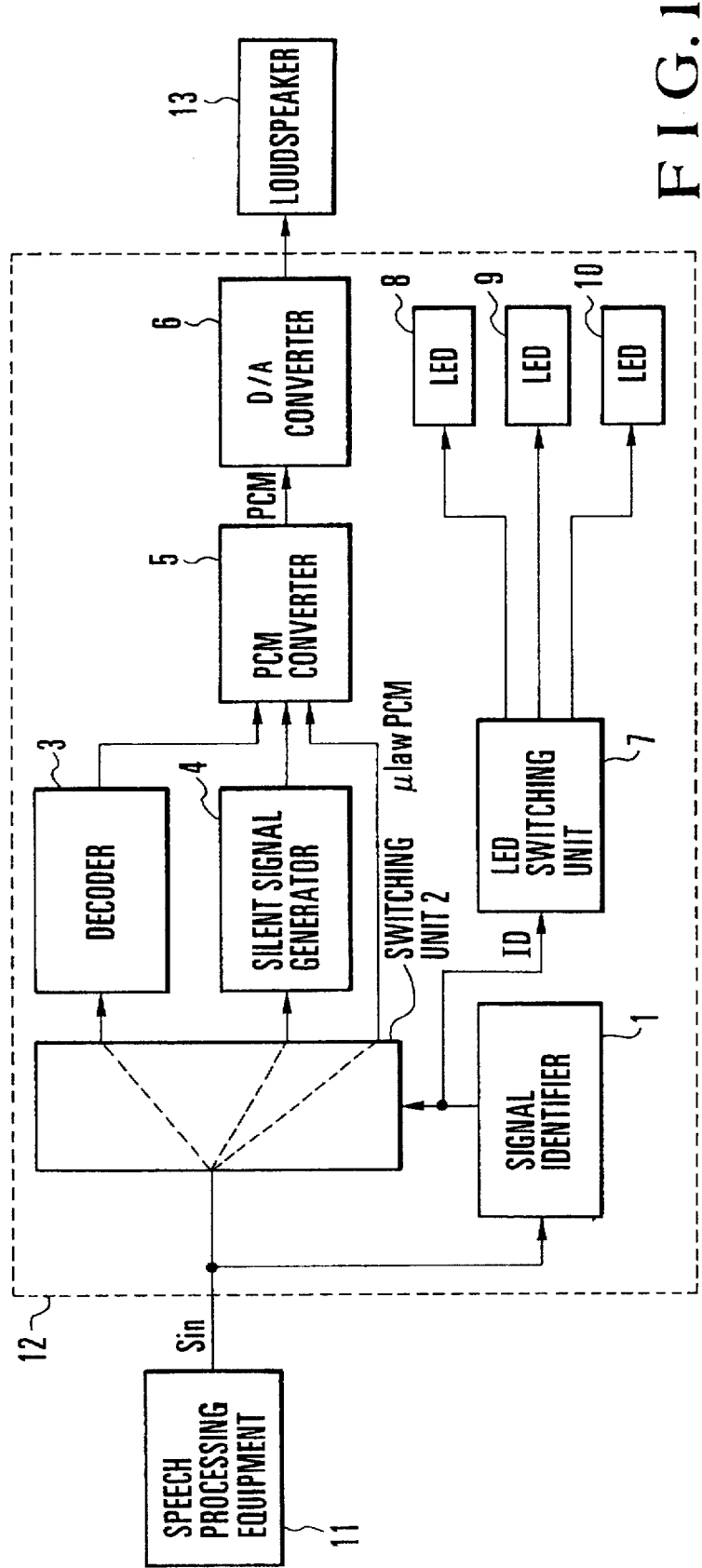

CALL MONITOR APPARATUS FOR SPEECH PROCESSING EQUIPMENT

BACKGROUND OF THE INVENTION

The present invention relates to a call monitor apparatus for monitoring an output from a speech processing equipment arranged in a base station of a digital mobile radio system and, more particularly, to a call monitor apparatus capable of identifying the operation mode of the speech processing equipment.

Conventionally, a speech processing equipment is arranged in a base station of a digital mobile radio system, e.g., a digital automobile telephone system, and this speech processing equipment performs signal conversion between a coded speech signal used in a radio zone and, for example, a µlaw PCM coded speech signal (to be referred to as a µlaw PCM signal hereinafter) used in a public telecommunication network.

As a coding algorithm for the coded speech signal used in the radio zone, for example, a CELP (Code Excited LPC Coding) scheme or the like is available. In addition, the µlaw PCM signal is a nonlinear quantized PCM signal using µlaw as compression/expansion characteristics.

As the operation modes of the speech processing equipment, three types of modes, i.e., a speech mode, a speech data mode, and a data mode are available. The speech mode is a mode for performing communication between a mobile station and a stationary station through a base station. In the speech mode, the speech processing equipment converts a coded speech signal into a µlaw PCM signal and outputs it to perform communication between a mobile station and a stationary station connected to a public telecommunication network.

The speech data mode is a mode for performing communication between one mobile station and the other mobile station through stationary stations without performing conversion. In communication between one mobile station and the other mobile station, if a coded speech signal from one mobile station was converted into a µlaw PCM signal, and the signal was converted into a coded speech signal again in the other mobile station through the public telecommunication network, it would cause voice quality to be degraded. For this reason, in the speech data mode, the speech processing equipment directly outputs the coded speech signal without performing conversion for decoding the coded speech signal, thereby preventing the voice quality from being degraded.

The data mode is a mode for data communication between facsimiles and the like. In the data mode, the speech processing equipment directly outputs an input data signal.

FIG. 2 shows a conventional call monitor apparatus for monitoring an output from the above speech processing equipment to monitor speech. Reference numeral 15 denotes a PCM converter for converting an output signal Sin from a speech processing equipment (not shown) into a linear quantized PCM signal (to be referred to as a PCM signal hereinafter) which is not compressed. Reference numeral 16 denotes an D/A converter for converting the PCM signal from the PCM converter 15 into an analog signal.

The PCM converter 15 converts the output signal Sin from the speech processing equipment into a PCM signal, and the D/A converter 16 converts an output from the PCM converter 15 into an analog signal. Therefore, when the operation mode of the speech processing equipment is the speech mode, an analog speech signal can be obtained as an output from the call monitor apparatus because the output signal Sin is a µlaw PCM signal. However, when the operation mode of the speech processing equipment is the speech data or data mode, an analog signal which generates a discordant noise is output from the call monitor apparatus because the output signal Sin is not a µlaw PCM signal.

In the conventional call monitor apparatus, speech of a call in the speech data mode cannot be monitored because the operation mode of the speech processing equipment cannot be identified as described above. In the speech data or data mode, discordant noise is generated.

SUMMARY OF THE INVENTION

It is an object of the present invention to provide a call monitor apparatus for a speech processing equipment, which performs a monitor operation corresponding to an operation mode.

It is another object of the present invention to provide a call monitor apparatus for a speech processing equipment, in which noise in a data mode is prevented from being generated.

In order to achieve the above objects, according to the present invention, there is provided a call monitor apparatus for a speech processing equipment, comprising a digital speech processing equipment having three types of operation modes constituted by a speech mode for outputting a µlaw PCM signal for communication between a mobile station and a stationary station, a speech data mode for outputting a coded speech signal for communication between mobile stations, and a data mode for outputting a data signal for data communication, signal identifying means for identifying an operation mode of the speech processing equipment on the basis of a unique word added to an output signal from the speech processing equipment and outputting an identification signal indicating an identification result of the operation mode, switching means for switching an output destination of the output signal from the speech processing equipment on the basis of the identification signal from the signal identifying means, decoding means for converting an output signal from the switching means into a µlaw PCM signal when the identification signal from the signal identifying means indicates the speech data mode, silent signal generating means for outputting a silent µlaw PCM signal on the basis of the output from the switching means when the identification signal from the signal identifying means indicates the data mode, PCM converting means for respectively converting, into PCM signals, an output signal output from the switching means when the identification signal from the signal identifying means indicates the speech mode and the µlaw PCM signals from the decoding means and the silent signal generating means, and A/D converting means for converting the PCM signals from the PCM converting means into analog signals.

BRIEF DESCRIPTION OF THE DRAWINGS

FIG. 1 is a block diagram showing a call monitor apparatus for a speech processing equipment according to an embodiment of the present invention; and FIG. 2 is a block diagram of a conventional call monitor apparatus for a speech processing equipment.

DESCRIPTION OF THE PREFERRED EMBODIMENT

FIG. 1 shows a call monitor apparatus for a speech processing equipment according to an embodiment of the present invention. Referring to FIG. 1, reference numeral 11 denotes a digital speech processing equipment having three types of operation modes constituted by a speech mode for outputting a μlaw PCM signal for communication between a mobile station and a stationary station, a speech data mode for outputting a coded speech signal for communication between mobile stations, and a data mode for outputting a data signal for data communication. Reference numeral 12 denotes a call monitor apparatus for monitoring an output signal Sin from the speech processing equipment 11. Reference numeral 13 denotes a loudspeaker for converting an output signal from the call monitor apparatus into an audible speech.

As seen in FIG. 1, the output signal Sin from the digital speech processing equipment 11 is inputted to the signal identifier 1 and the switch unit 2. In the call monitor apparatus 12, reference numeral 1 denotes a signal identifier for identifying an operation mode on the basis of a signal from the digital speech processing equipment 11 and outputting an identification result as an identification signal ID. Reference numeral 2 denotes a switching unit for switching the output destination of the output signal Sin from the digital speech processing equipment 11 on the basis of the identification signal ID from the signal identifier 1. Reference numeral 3 denotes a decoder for receiving an output signal from the switching unit 2 and converting the output signal into a μlaw PCM signal when the identification signal ID indicates the speech data mode. Reference numeral 4 denotes a silent signal generator for receiving an output signal from the switching unit 2 and outputting a silent μlaw PCM signal when the identification signal ID indicates the data mode.

Reference numeral 5 denotes a PCM converter for respectively converting, into linear quantized PCM signals, the output signal output from the switching unit 2 when the identification signal ID indicates the speech mode and the μlaw PCM signals output from the decoder 3 and the silent signal generator 4. Reference numeral 6 denotes a D/A converter for converting the linear quantized PCM signals from the PCM converter 5 into analog signals. Reference numeral 7 denotes an LED switching unit for switching the displays of the operation modes of the digital speech processing equipment 11 on the basis of the identification signal ID. Reference numeral 8 denotes a speech data mode displaying LED. Reference numeral 9 denotes a data mode displaying a speech mode displaying LED. The LEDs 8 to 10 are switched by the LED switching unit 7 to be selectively turned on. The LED switching unit 7 and the LEDs 8 to 10 constitute the display unit of the call monitor apparatus 12.

The operation of the call monitor apparatus 12 arranged as described above will be described below. The signal identifier 1 identifies the current mode of the digital speech processing equipment 11. This identification is performed on the basis of a unique word added to the output signal Sin output from the digital speech processing equipment 11.

More specifically, when the digital speech processing equipment 11 is operated in the speech data mode, a unique word indicating the speech data mode is added to the output signal Sin which comprises the coded speech signal. Similarly, the digital speech processing equipment 11 is operated in the data mode, and a unique word indicating the data mode is added to the output signal Sin, which comprises the data signal. On the other hand, when the digital speech processing equipment 11 is operated in the speech mode, no unique word is added to the output signal Sin, which comprises the PCM signal. Therefore, when the unique word is detected and analyzed, an operation mode can be identified. The signal identifier 1 which analyzes the unique word outputs an identification signal ID indicating the identification result of the operation mode.

The switching unit 2 switches the output destination of the output signal Sin from the digital speech processing equipment 11 on the basis of the identification signal ID. More specifically, when the identification signal ID indicates the speech data mode, the switching unit 2 outputs the output signal Sin to the decoder 3 because the output signal Sin is a coded speech signal. The decoder 3 converts the output signal Sin from the switching unit 2 into a μlaw PCM signal, and the PCM converter 5 converts the μlaw PCM signal from the decoder 3 into a linear-quantized PCM signal. The D/A converter 6 converts the linear-quantized PCM signal from the PCM converter 5 into an analog signal and outputs it.

In this manner, even if the digital speech processing equipment 11 is operated in the speech data mode, an analog speech signal can be obtained as an output from the call monitor apparatus 12. Therefore, for example, when the loudspeaker 13 is connected to the output terminal of the call monitor apparatus 12, speech of a call in the speech data mode can be listened to.

The signal identifier 1 also outputs the identification signal ID to the LED switching unit 7, and the LED switching unit 7 drives the speech data mode displaying LED 8 to turn on the LED 8. When the LED 8 is turned on, it can be confirmed that the operation mode of the digital speech processing equipment 11 is set to be the speech data mode.

When the identification signal ID from the signal identifier 1 indicates the data mode, the switching unit 2 outputs the output signal Sin to the silent signal generator 4 because the output signal Sin is a data signal for data communication. When the silent signal generator 4 receives the output signal Sin from the switching unit 2, the silent signal generator 4 outputs a silent μlaw PCM signal. The silent μlaw PCM signal from the silent signal generator 4 is output to the PCM converter 5, and, as in the case described above, an analog signal is output by the PCM converter 5 and the D/A converter 6. The analog signal obtained by D/A converting the silent μlaw PCM signal is a silent speech signal, and discordant noise is not generated at the loudspeaker 13 connected to the output terminal of the call monitor apparatus 12.

In addition, the LED switching unit 7 drives the data mode displaying LED 9 in accordance with the identification signal ID. Therefore, the LED 9 is turned on, and it can be confirmed that the operation mode of the digital speech processing equipment 11 is set to be the data mode.

When the identification signal ID from the signal identifier 1 indicates the speech mode, the output signal Sin is already the μlaw PCM signal, and the output signal Sin need not be converted. For this reason, the switching unit 2 directly outputs the output signal Sin to the PCM converter 5. Subsequently, since an analog speech signal is output by the PCM converter 5 and the D/A converter 6 in the same manner as described above, speech of a call in the speech mode can be monitored by means of the loudspeaker 13.

In addition, the LED switching unit 7 drives the speech mode displaying LED 10 in accordance with the identification signal ID. Therefore, the LED 10 is turned on, and it can be confirmed that the operation mode of the digital speech processing equipment is set to be the speech mode.

Note that, although the operation mode of the speech processing equipment is displayed by the display unit constituted by the LED switching Unit 7 and the LEDs 8 to 10 in this embodiment, the operation mode may be displayed by, e.g., a CRT display device or the like.

According to the present invention, the operation mode of the speech processing equipment is identified by the signal identifier. An output signal from the speech processing equipment is directly converted into an analog signal when the speech mode is set. The output signal is converted into a μlaw PCM signal and then converted into an analog signal when the speech data mode is set. A silent μlaw PCM signal is converted into an analog signal when the data mode is set. For this reason, speech of a call can be monitored in not only the speech mode but also the speech data mode, and a silent speech signal is output in the data mode. Therefore, discordant noise is not generated.

In addition, the operation mode of the speech processing equipment is, identified by the signal identifier, and the operation mode is displayed by the display unit. Therefore, the operation mode of the speech processing equipment can be easily recognized.

What is claimed is:

1. A call monitor apparatus for a speech processing equipment, comprising:

a digital speech processing equipment having three types of operation modes constituted by a speech mode for outputting a μlaw PCM signal for communication between a mobile station and a stationary station, a speech data mode for outputting a coded speech signal for communication between mobile stations, and a data mode for outputting a data signal for data communication;

signal identifying means for identifying an operation mode of said speech processing equipment on the basis of a unique word added to an output signal from said speech processing equipment and outputting an identification signal indicating an identification result of the operation mode;

switching means for switching an output destination of the output signal from said speech processing equipment on the basis of the identification signal from said signal identifying means;

decoding means for converting an output signal from said switching means into a μlaw PCM signal when the identification signal from said signal identifying means indicates the speech data mode;

silent signal generating means for outputting a silent μlaw PCM signal on the basis of the output from said switching means when the identification signal from said signal identifying means indicates the data mode;

PCM converting means for respectively converting, into linear-quantized PCM signals, an output signal output from said switching means when the identification signal from said signal identifying means indicates the speech mode and the μlaw PCM signals from said decoding means and said silent signal generating means; and D/A converting means for converting the linear-quantized PCM signals from said PCM converting means into analog signals.

2. An apparatus according to claim 1, further comprising display means for identifying and displaying an operation mode of said speech processing equipment on the basis of the identification signal from said signal identifying means.

3. An apparatus according to claim 1, further comprising electroacoustic converting means for converting the analog signals from said D/A converting means into audible speech signals.

4. A call monitor apparatus for a speech processing equipment, comprising:

a digital speech processing equipment having three types of operation modes constituted by a speech mode for outputting a μlaw PCM signal for communication between a mobile station and a stationary station, a speech data mode for outputting a coded speech signal for communication between mobile stations, and a data mode for outputting a data signal for data communication;

signal identifying means for identifying an operation mode of said digital speech processing equipment on the basis of a unique word added to an output signal from said digital speech processing equipment and outputting an identification signal indicating an identification result; and displaying means for identifying and displaying the operation mode of said digital speech processing equipment on the basis of the identification signal output from said signal identifying means.

5. A call monitor apparatus, comprising:

an input port configured to receive an input signal;

a signal identifier circuit connected to receive the input signal from the input port and to determine a category of the input signal, the category of the input signal being one of: a) a coded speech signal, b) a data signal, and c) a μlaw-PCM signal, the signal identifier circuit configured to output a determination signal as a result thereof;

a switch connected to receive the input signal from the input port and the determination signal from the signal identifier circuit, the switch configured to: a) output the input signal to a first output port if the input signal is determined to be the coded speech signal, b) output the input signal to a second output port if the input signal is determined to be the data signal, and c) output the input signal to a third output port if the input signal is determined to be the μlaw-PCM signal;

a decoder connected to the first output port of the switch and configured to convert the coded speech signal into a μlaw-PCM coded speech signal;

a silent signal generator connected to the second output port of the switch and configured to convert the data signal into a silent μlaw-PCM data signal;

a PCM converter connected to receive the μlaw-PCM coded speech signal from the decoder, the μlaw-PCM data signal from the silent signal generator, and the μlaw-PCM signal from the third output port of the switch, the PCM converter configured to convert a received μlaw-PCM signal into a linear-quantized PCM signal; and a D/A converter connected to the PCM converter and configured to convert the linear-quantized PCM signal into an analog signal.

6. An apparatus according to claim 5, further comprising a display unit connected to receive the determination signal from the signal identifier circuit and to output a signal indicating whether the input signal is the coded speech signal, the data signal, or the μ-law PCM signal.

* * * * *